US006947928B2

(12) United States Patent
Dettinger et al.

(10) Patent No.: US 6,947,928 B2
(45) Date of Patent: Sep. 20, 2005

(54) GRAPHICAL USER INTERFACE FOR BUILDING QUERIES WITH HIERARCHICAL CONDITIONS

(75) Inventors: Richard Dean Dettinger, Rochester, MN (US); Peter John Johnson, Rochester, MN (US); Richard Joseph Stevens, Mantorville, MN (US); Ikhua Tong, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 10/083,073

(22) Filed: Feb. 26, 2002

(65) Prior Publication Data

US 2003/0163455 A1 Aug. 28, 2003

(51) Int. Cl.[7] .............................................. G08F 17/30
(52) U.S. Cl. ............................. 707/4; 707/1; 707/104.1
(58) Field of Search ............................. 707/104.1, 1, 4

(56) References Cited

U.S. PATENT DOCUMENTS 6,026,409 A * 2/2000 Blumenthal .............. 707/104.1
6,725,227 B1    4/2004 Li
2002/0123984 A1 * 9/2002 Prakash ........................ 707/1

OTHER PUBLICATIONS

U.S. Appl. No. 60/164,021, Prakash, filed Aug. 23, 1999.*
U.S. Appl. No. 10/094,531, filed Mar. 8, 2002, Dettinger et al., ROC920020067US1, "Graphical User Interface to Build Event–Based Dynamic Searches or Queries Using Event Profiles".

* cited by examiner

*Primary Examiner*—Charles Rones
(74) *Attorney, Agent, or Firm*—Moser, Patterson & Sheridan, LLP

(57) ABSTRACT

The present invention generally provides methods, systems and articles of manufacture for programmatically providing a user interface for creating queries. In one embodiment, graphical user interface content which defines a graphical user interface is provided. The graphical user interface comprises (i) a region for displaying conditions of a query; and (ii) a first graphical element for initiating a process of combining two or more conditions of the query together with logic values to form a complex condition. In another embodiment, the graphical user interface further comprises a second graphical element for initiating a process of separating two or more conditions of a complex condition.

49 Claims, 10 Drawing Sheets

GRAPHICAL USER INTERFACE FOR BUILDING QUERIES WITH HIERARCHICAL CONDITIONS

BACKGROUND OF THE INVENTION

1. Field of the Invention

The present invention generally relates to data processing and more particularly to user interfaces for accessing data.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

Often, the queries take the form of hierarchical conditions. As defined herein, a simple condition is a comparison operation (e.g., >, <, =). An illustrative simple condition is (employeeName='Rich'). One or more simple conditions may then be grouped together by Boolean logic operators to produce complex (or grouped) conditions. An example of a complex condition is ((employeeName='Rich') OR (employeeName='John')). Further, simple conditions and complex conditions may be connected by Boolean logic operators to produce a hierarchy of conditions. The representation of hierarchical conditions (including complex/grouped conditions) in a visual layout where users can intuitively manipulate the groups presents substantial difficulties. The problem is further complicated when the user interface to the underlying data must be a graphical user interface (GUI), such as a web browser, because of the limited GUI elements that are available to work with.

To understand the unique difficulties presented by hierarchical conditions consider the following illustrations.

Data Hierarchy Illustration

```
<employee>
    <firstName>Rich</firstName>
    <lastName>Dettinger</lastName>
</employee>
```

Condition Hierarchy Illustration

```
<AND>
    <OR>
        <employeeName = 'Rich'>
        <employeeName = 'John'>
    <employeeHire before 01/01/2000>
```

The first illustration (Data Hierarchy Illustration) is an XML data document fragment which has an obvious meaning. Specifically, the firstName and the lastName belong to the employee. It is therefore feasible to show only <employee> without loss of meaning because users have a fundamental understanding of the whole structure.

In contrast, the hierarchy of conditions illustrated above (Condition Hierarchy Illustration) is simply unrelated groupings. When the data represents conditions, a user interface cannot selectively not show subconditions because the user loses all context. This is because the hierarchy of conditions is arbitrary. For example, the above illustrated condition hierarchy represents the following relational expression: ((employeeName='Rich') OR (employeeName='John')) AND (employeeHire before 01/01/200). However, there is no reason that a user may not want the following query instead: (employeeName='Rich') OR ((employeeName='John') AND (employeeHire before 01/01/200)). This latter expression is considerably different than the first, but equally valid.

Accordingly, the ability to represent hierarchical conditions (including complex/grouped conditions) in a visual layout where users can intuitively manipulate the groups it critical to being able to generate valid mathematical operations, relational database queries, etc.

Therefore, there is a need for a method and system for visually representing hierarchical conditions capable of being manipulated by users.

SUMMARY OF THE INVENTION

The present invention generally is directed to a method, system and article of manufacture for visually representing hierarchical conditions capable of being manipulated by users.

One embodiment provides a method of programmatically providing a user interface for creating queries, the method comprises providing graphical user interface content which defines a graphical user interface. In one embodiment, the graphical user interface comprises (i) a region for displaying conditions of a query; and (ii) a first graphical element for initiating a process of combining two or more conditions of the query together with logic values to form a complex condition.

In another embodiment, a method of programmatically providing a user interface for creating queries, comprising generating graphical user interface (GUI) content which, when processed by a GUI-based program, defines the aforementioned graphical user interface. The method further comprises, in response to a user event activating the first graphical element, (i) combining two or more user-selected conditions of the query together to form the complex condition; and (ii) outputting information which, when rendered on a display device, displays the complex condition.

Still another embodiment provides a computer-readable medium containing a program which, when executed by a processor, performs the aforementioned methods.

Yet another embodiment provides a computer, comprising a memory containing at least an application; and a processor communicably connected to the memory and which, when executing the application, performs an operation of generating a user interface for creating queries. The operation comprises generating graphical user interface content which defines a graphical user interface, comprising: (i) a region for displaying conditions of a query; and (ii) a first graphical element for initiating a process of combining two or more conditions of the query together with logic values to form a complex condition.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally is directed to a system, method and article of manufacture for visually representing hierarchical conditions capable of being manipulated by users. In one embodiment, a graphical user interface comprises a first graphical element for initiating a process of combining two or more conditions of a query together with logic values to form a complex condition. In another embodiment, the graphical user interface comprises a second graphical element for initiating a process of separating two or more conditions of the complex condition.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Figure 1:
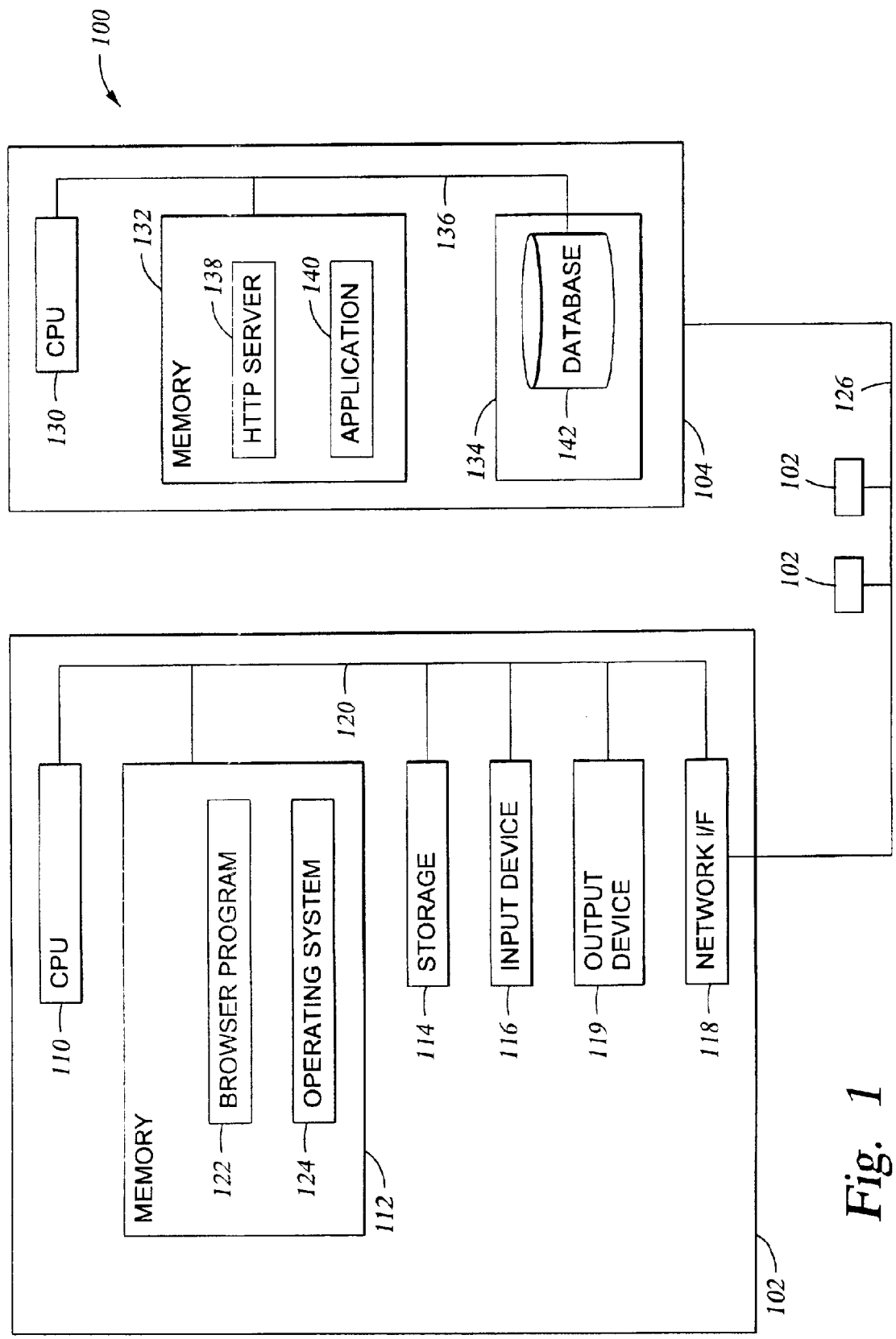
FIG. 1 is a computer system illustratively utilized in accordance with the invention.
Figure 2:
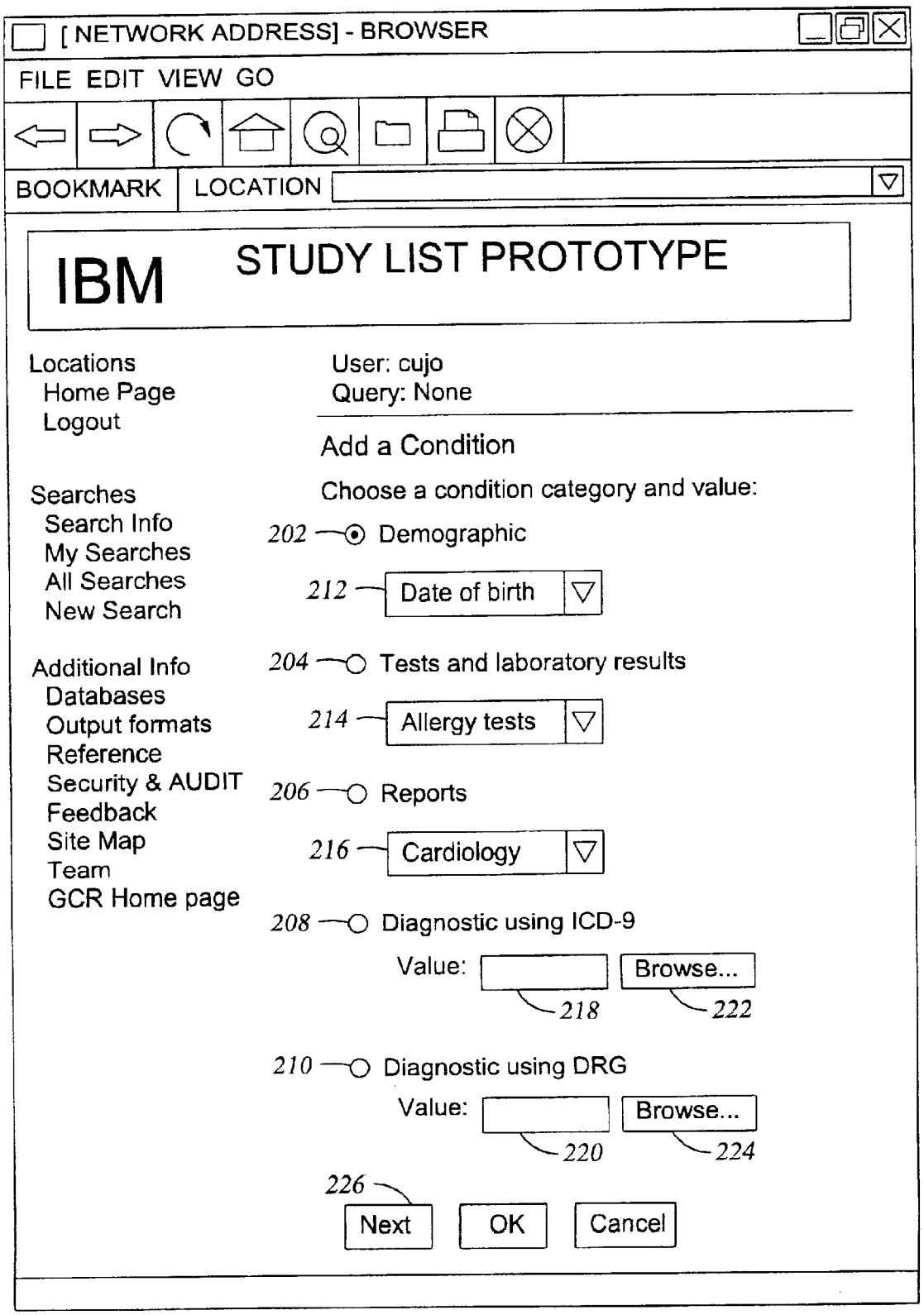
FIG. 2 is a graphical user interface screen for initiating the process of adding a condition to a query.
Figure 3:
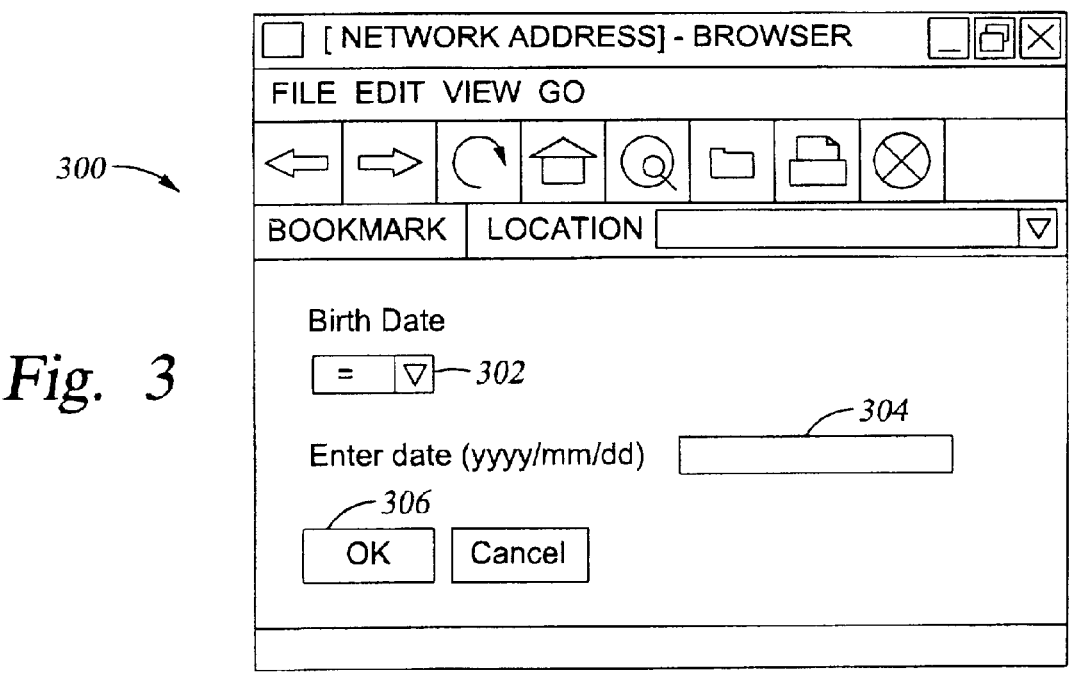
FIG. 3 is a graphical user interface screen for adding a birth date as a condition to a query.

FIG. 1 depicts a block diagram of a networked system 100 in which embodiments of the present invention may be implemented. In general, the networked system 100 includes a client (e.g., user's) computer 102 (three such client computers 102 are shown) and at least one server 104 (five such servers 104 are shown). The client computer 102 and the server computer 104 are connected via a network 126. In general, the network 126 may be a local area network (LAN) and/or a wide area network (WAN). In a particular embodiment, the network 126 is the Internet.

The client computer 102 includes a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, trackball, or speech recognition unit, audio/video player, and the like could be used. The output device 119 can be any device to give output to the user, e.g., any conventional display screen. Although shown separately from the input device 116, the output device 119 and input device 116 could be combined. For example, a display screen with an integrated touch-screen, a display with an integrated keyboard, or a speech recognition unit combined with a text speech converter could be used.

The network interface device 118 may be any entry/exit device configured to allow network communications between the client computer 102 and the server computers 104 via the network 126. For example, the network interface device 118 may be a network adapter or other network interface card (NIC).

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Illustrative operating systems, which may be used to advantage, include Linux and Microsoft's Windows. More generally, any operating system supporting the functions disclosed herein may be used.

The memory 112 is also shown containing a browser program 122 that, when executed on CPU 110, provides support for navigating between the various servers 104 and locating network addresses at one or more of the servers 104. In one embodiment, the browser program 122 includes a web-based Graphical User Interface (GUI), which allows the user to display Hyper Text Markup Language (HTML) information. More generally, however, the browser program 122 may be any GUI-based program capable of rendering the information transmitted from the server computer 104.

Each server computer 104 may by physically arranged in a manner similar to the client computer 102. Accordingly, each server computer 104 is shown generally comprising a CPU 130, a memory 132, and a storage device 134, coupled to one another by a bus 136. Memory 132 may be a random access memory sufficiently large to hold the necessary programming and data structures that are located on the server computer 104.

As shown, the memory 132 includes a Hypertext Transfer Protocol (http) server process 138 (e.g., a web server) adapted to service requests from the client computer 102. For example, the process 138 may respond to requests to access a data repository 142, which illustratively resides on the server 104. In particular, incoming client requests for data from the data repository 142 invoke an application 140. When executed by the processor 130, the application 140 causes the server computer 104 to perform the steps or elements embodying the various aspects of the invention, including accessing the data repository 142. In one embodiment, the application 140 comprises a plurality of servlets configured to build a graphical user interface (GUI), which is then rendered by the browser program 102. Embodiments of GUIs will be described below.

FIG. 1 is merely one hardware/software configuration for the networked client computer 102 and server computer 104. Embodiments of the present invention can apply to any comparable hardware configuration, regardless of whether the computer systems are complicated, multi-user computing apparatus, single-user workstations, or network appliances that do not have non-volatile storage of their own. Further, it is understood that while reference is made to particular markup languages, including HTML, the invention is not limited to a particular language, standard or version. Accordingly, persons skilled in the art will recognize that the invention is adaptable to other markup languages as well as non-markup languages and that the invention is also adaptable future changes in a particular markup language as well as to other languages presently unknown. Likewise, the http server process 138 shown in FIG. 1 is merely illustrative and other embodiments adapted to support any known and unknown protocols are contemplated.

Referring now to FIGS. 2–7, a series of graphical user interfaces are shown illustrating the user interfaces defined by the application 140. By way of illustration, the graphical user interfaces shown in FIGS. 2–7 are specific to accessing medical data. However, embodiments of the invention may be used to advantage with any type of information including, for example, financial information, employment information, etc. In general, the graphical user interfaces shown in FIGS. 2–7 allow a user to build queries comprising conditions added by the user. Recall that, as defined herein, a simple condition is a comparison operation. An illustrative simple condition is (DateOfBirth='1942/01/01'). Thus, adding a simple condition to a query generally involves allowing the user to select operands and a comparison operator (e.g., >, <, =). In one embodiment, when a user initially invokes the application 140 via the browser program 122, the application 140 returns HTML content which is rendered by the browser program 122 in the form of a first GUI 200, shown in FIG. 2. The GUI 200 is the first of a series of screens which a user uses to add a condition to a query. In general, the GUI 200 includes a plurality of condition categories 202–210 from which a user may select. The condition categories shown include "demographics" 202, "tests and laboratory results" 204, "reports" 206, "diagnostic using ICD-9" 208, and "diagnostic using DRG" 210. Each of the condition categories has an associated field 212–220 from/into which a value may be selected/input. Some fields (e.g., fields 212–216) are drop-down menus, while others are text boxes (e.g., fields 218–220) for receiving user input. In the latter case, the fields may have associated Browse buttons 222–224 to facilitate user selection of valid values.

Once a condition category and value have been selected, the user clicks on the Next button 226. Clicking the Next button 226 causes the browser program 122 to render (according to information provided by the application 140) the next appropriate graphical user interface necessary to continue the process of adding a condition. In this manner, the user may be presented with a series of graphical user interfaces necessary to add a condition. By way of example, assume that the user has selected the demographic condition category 202 and the "date of birth" value from the drop-down menu 212. Upon pressing the Next button 226, the user is presented with a second GUI 300 shown in FIG. 3. The GUI 300 comprises a comparison operator drop-down menu 302 from which a user may select a comparison operator (e.g., >, <, =) and a date field 304 into which a user may input a date according to a prescribed format (e.g., "yyyy/mm/dd"). The process of adding the date of birth condition is completed when the user clicks on the OK button 306.

Figure 4:
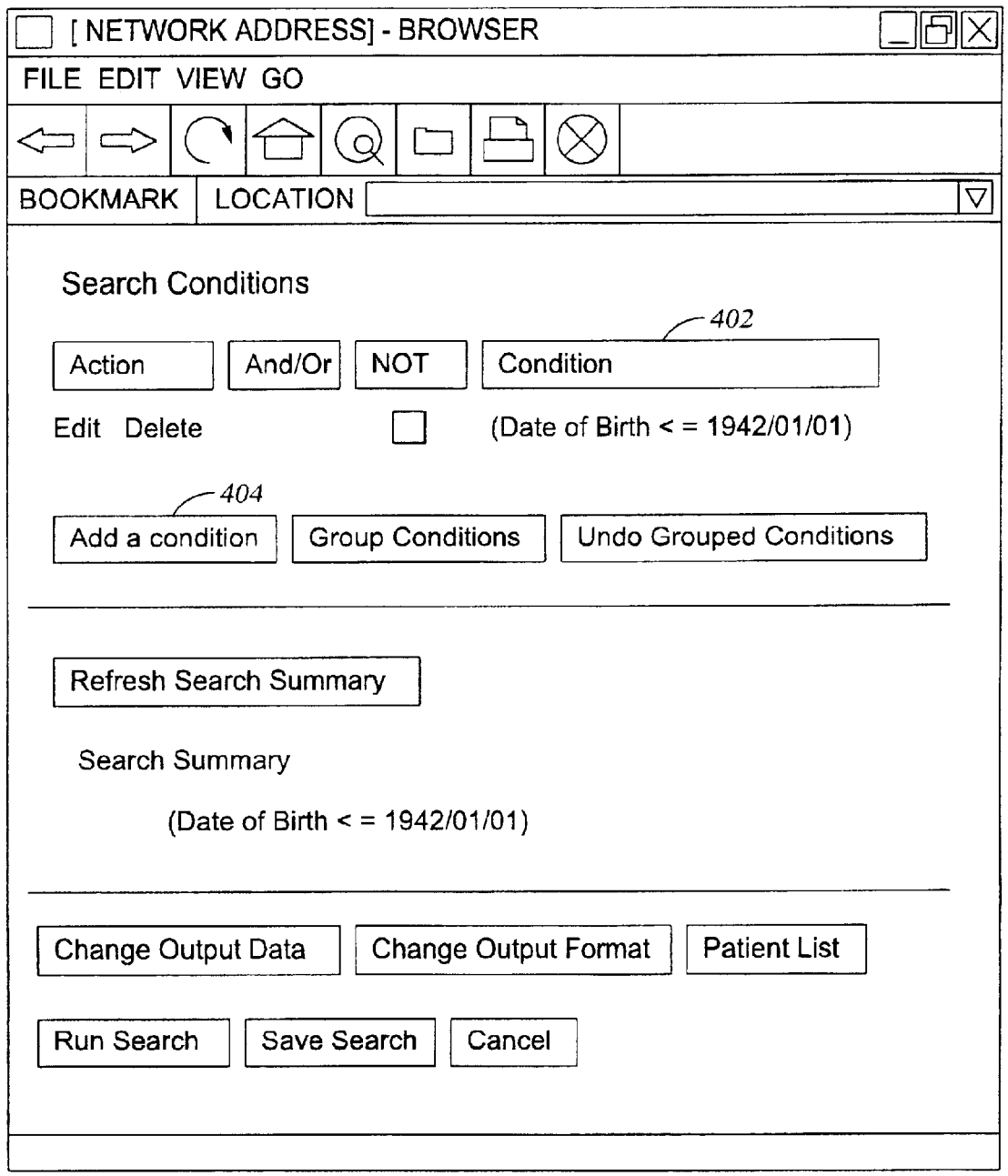
FIG. 4 is a graphical user interface screen displaying existing conditions to a query and from which a user may add additional conditions to the query and execute the query.
Figure 5:
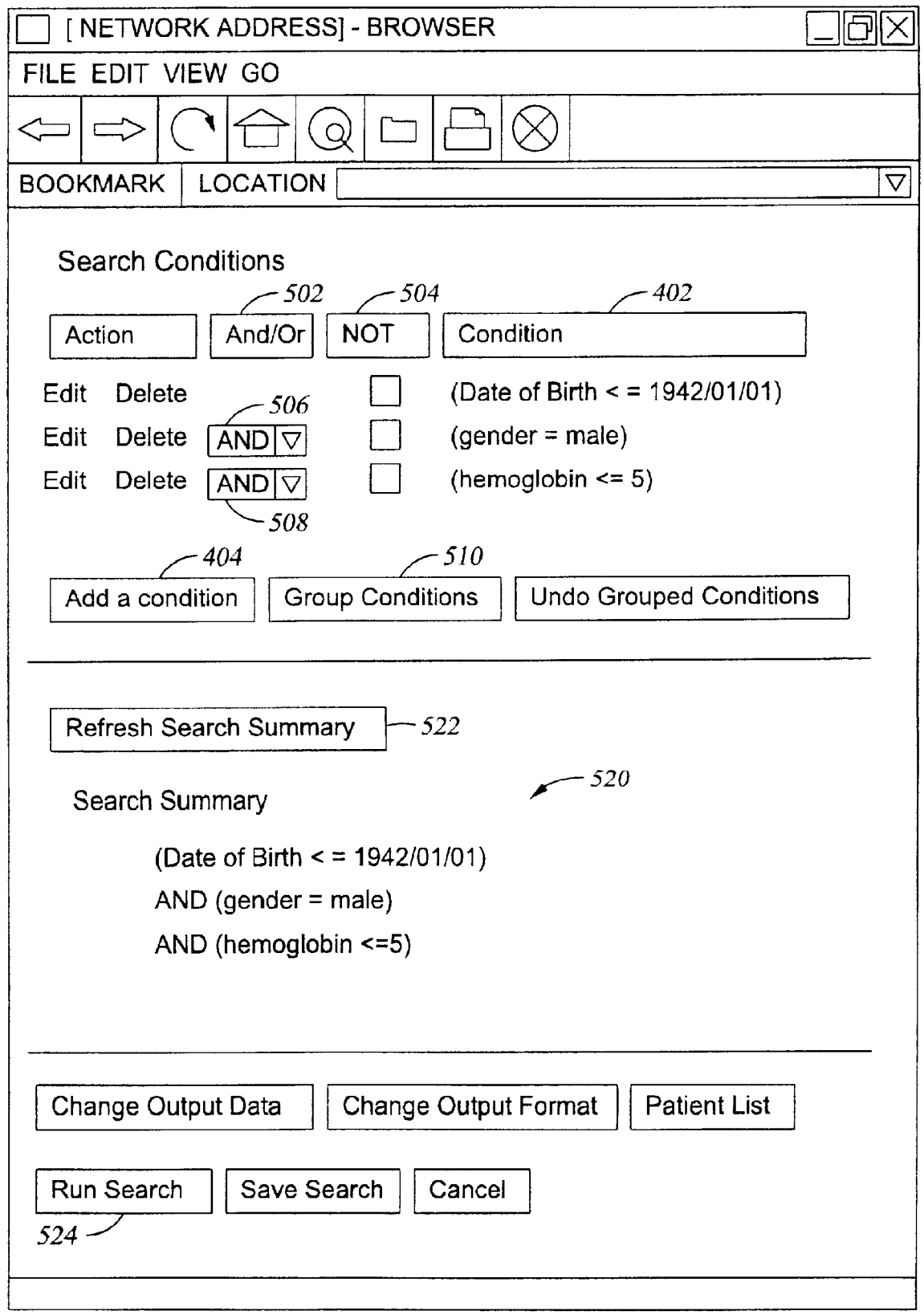
FIG. 5 is the graphical user interface screen of FIG. 4 after being updated with additional conditions.

When the user has completed the process of adding a condition (e.g., such as after clicking the OK button 306), the user is presented with the GUI 400 shown in FIG. 4. The resulting conditions are shown in a condition column 402. In the present example, a first row of the condition column 402 shows the date of birth condition added using the GUIs 200 and 300 described above. The user may add another condition by clicking the "Add a Condition" button 404. By repeating similar steps for each of the other available condition categories and values, any number of conditions may be added to a query. By way of illustration, the refreshed/updated GUI 400 shown in FIG. 5 shows a total of three conditions (including the date of birth condition described above), each of which were added by stepping through the graphical user interfaces for adding a condition (e.g., the GUIs 200 and 300). Further, although not shown, adding a condition may require any number of other graphical user interfaces. In particular, a plurality of additional graphical user interfaces may be required for more complicated conditions, such as ranges. The particular number, content, design and elements of such graphical user interfaces may be determined by persons skilled in the art according to aspects of the invention.

It should be understood that each of the resulting conditions (examples of which are shown in FIG. 5) is a predefined possibility, according to the available condition categories and values provided by the graphical user interfaces for adding a condition (e.g., the GUIs 200 and 300). By preventing the possibility of unexpected user modifications to a query, at least one aspect of the invention eliminates the need for a parser.

After the first condition has been added, each of the subsequent conditions are related to one another to the first condition by a Boolean logic value/operator, referred to herein as a first level Boolean logic value. Referring to FIG. 5, the first level Boolean logic values are shown in a pair of columns 502, 504. The first level Boolean logic values AND and OR are selected from drop-down menus 506, 508 in the first column 502. An AND/OR drop-down menu is located between each condition. Accordingly, in the illustration shown in FIG. 5, a first drop-down menu 506 is located between the "date of birth" condition and the "gender" condition and a second drop-down menu 508 is located between the "gender" condition and a "hemoglobin" condition. In one embodiment, the first level Boolean logic value defaults to AND for each condition added after the first condition. A user may then change the default value to OR using the drop-down menu. Alternatively, the user may negate the condition by checking the appropriate NOT checkbox in the second column 504.

Once two or more conditions have been added to a query, two or more conditions may then be grouped together by Boolean logic values, referred to herein as second level Boolean logic values, to produce complex (or grouped) conditions. An example of a complex condition is ((employeeName='Rich') OR (employeeName='John')). Further, simple conditions and complex conditions may be connected by Boolean logic values to produce a hierarchy of conditions. In one embodiment, the first graphical element used to group conditions together is a "Group Conditions" button 510.

Figure 6:
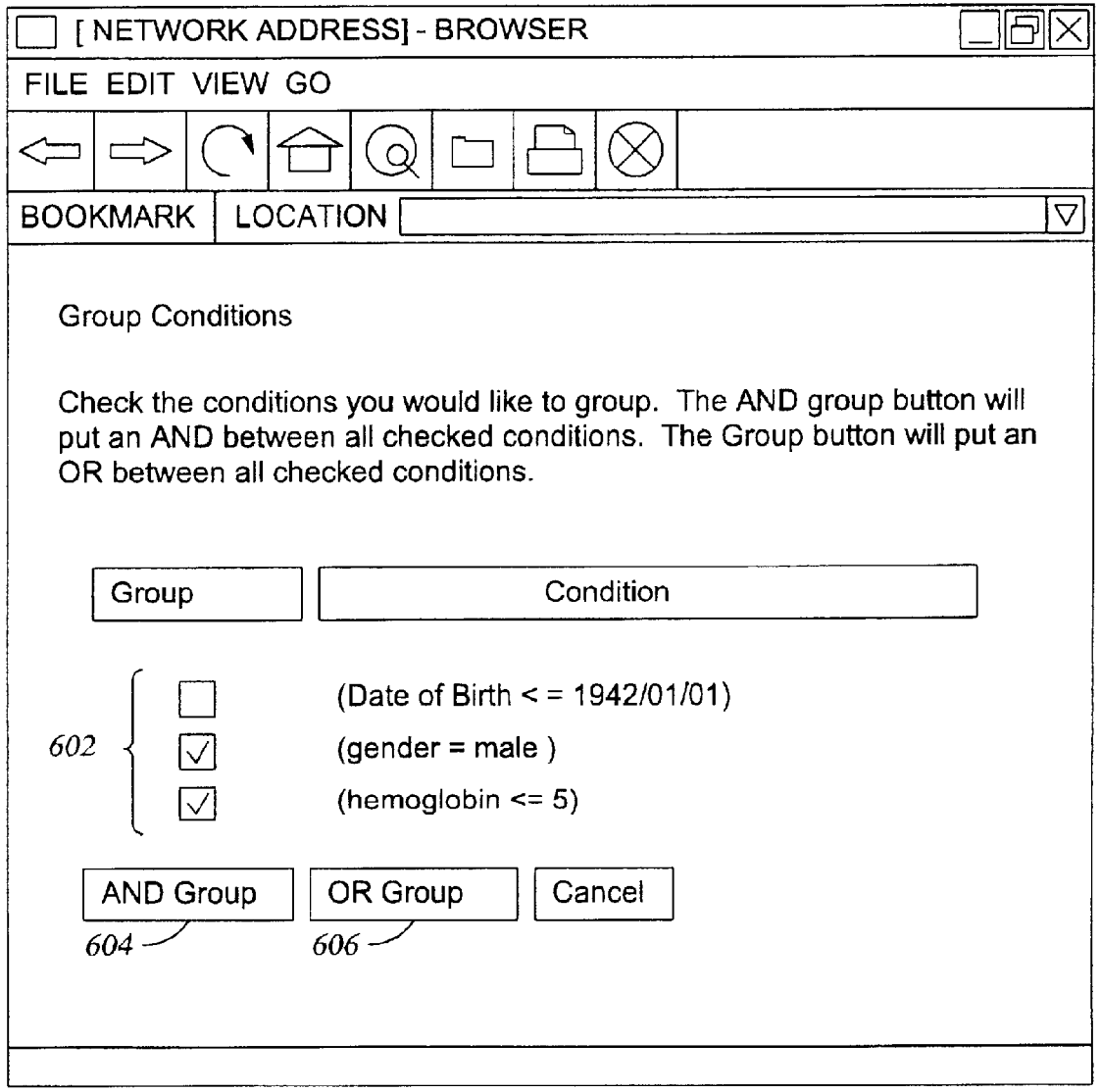
FIG. 6 is a graphical user interface screen from which a user may group conditions to form a complex condition.

In one embodiment, pressing the "Group Conditions" button 510 causes the application 140 to generate the GUI 600 shown in FIG. 6. The GUI 600 displays each of the available conditions and an associated checkbox 602 for each condition. The user selects which conditions are to be grouped together by checking the appropriate checkbox 602. Illustratively, the "gender" and the "hemoglobin" conditions are selected. The GUI 600 further provides an "AND Group" button 604 and an "OR Group" button 606, for ANDing or Oring the selected groups. Assume, by way of illustration, that a user clicks the "AND Group" button 604. The result of this action is shown by the updated GUI 500 in FIG. 7. Specifically, only to conditions 702, 704 remain, with the second condition 704 being a complex condition comprising to sub conditions related by a Boolean AND. Further, the two conditions 702, 704 are themselves related by a Boolean AND, shown in the drop-down menu 506.

Figure 8:
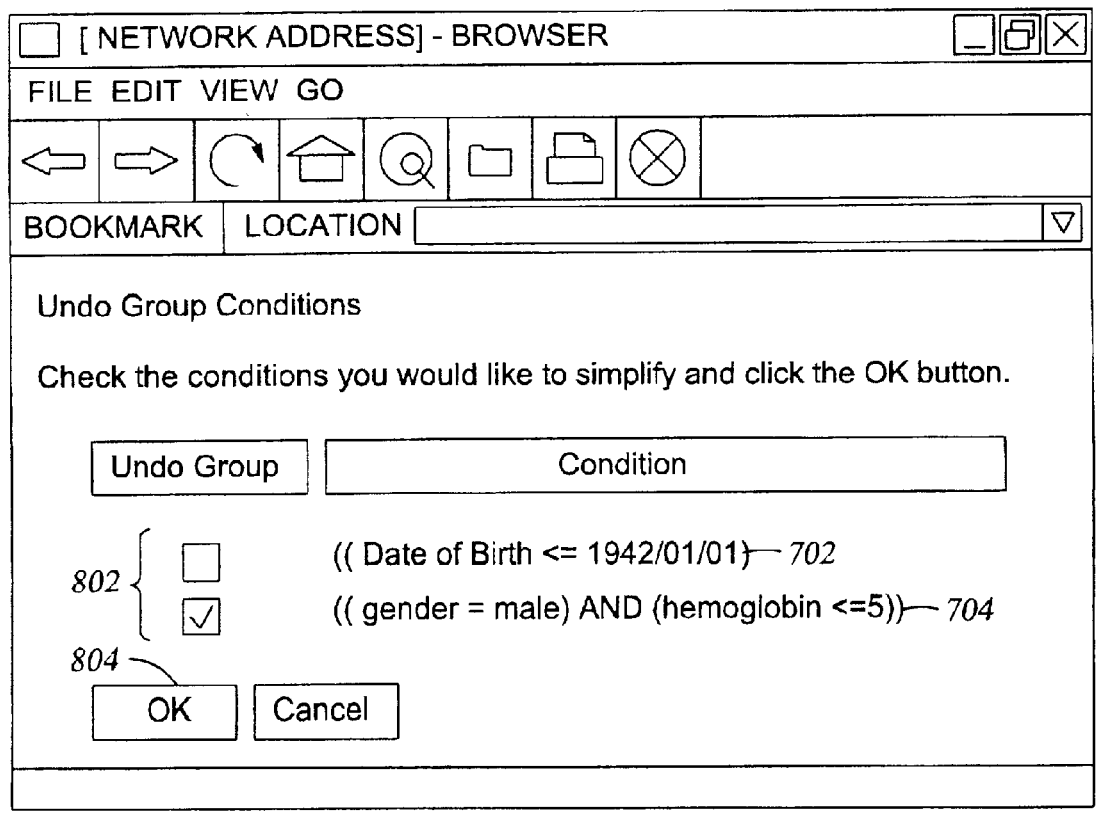
FIG. 8 is a graphical user interface screen from which a user may and group conditions of a complex condition.

Assume now that a user desires to ungroup the second condition 704. To facilitate this task, the GUI 500 (shown in FIG. 7) includes an "Undo Grouped Conditions" button 706. Pressing the "Undo Grouped Conditions" button 706 causes the application 140 to generate the GUI 800 shown in FIG. 8. The GUI 800 displays each of the existing conditions and an associated checkbox 802. In alternative embodiment, only the complex conditions (such as the second condition 704 in this case) are shown in the GUI 800. In any event, to ungroup a complex condition, the user checks the appropriate checkbox 802 and then clicks the OK button 804. In this case, the result of ungrouping the second condition 704 is shown by the GUI 500 and FIG. 5. That is, the conditions are returned to their original ungrouped states.

Figure 7:
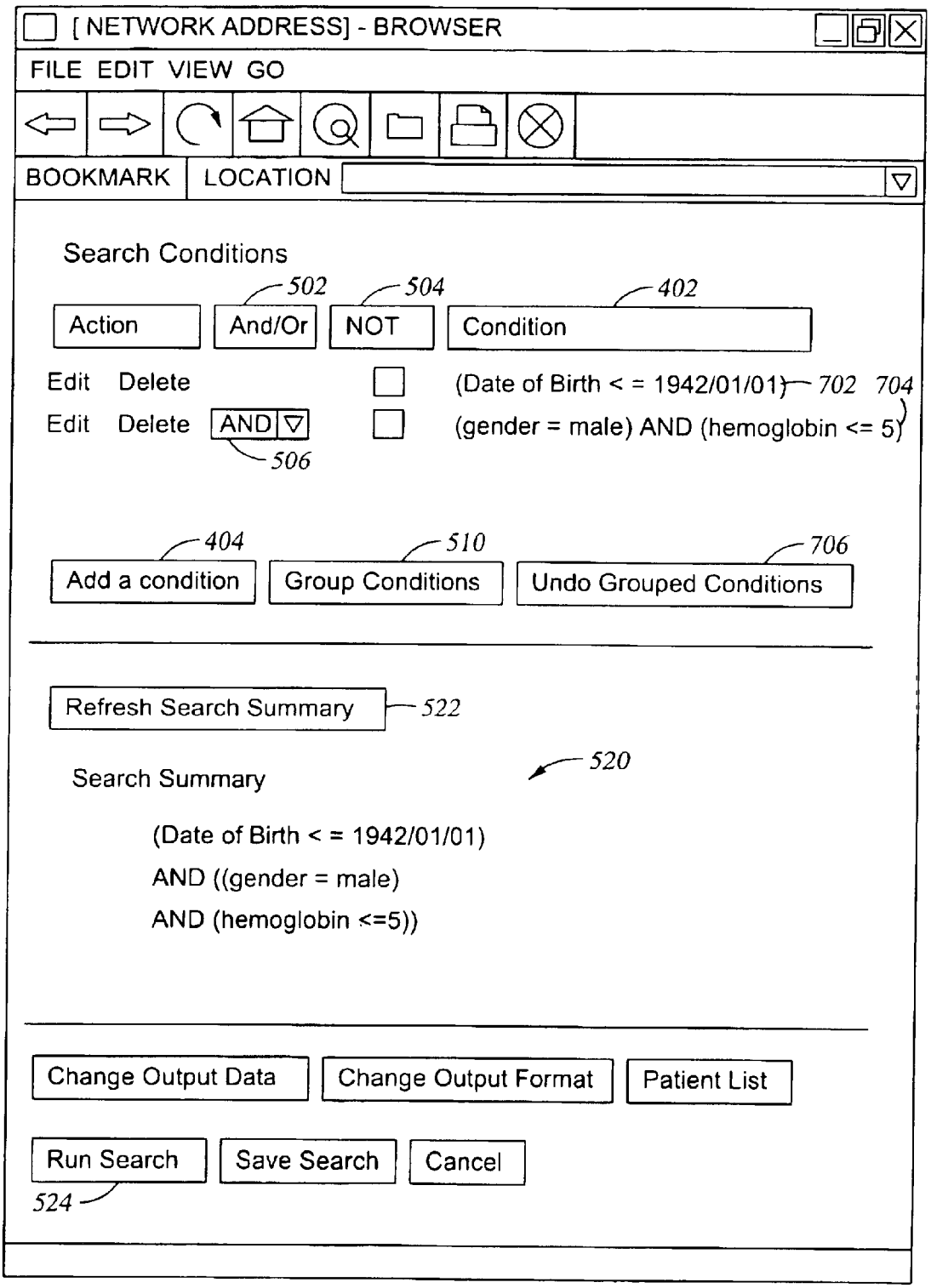
FIG. 7 is the graphical user interface screen of FIG. 4 after having been updated to reflect grouped conditions.

The current structure of a given query may be viewed by a user in a search summary section 520 of the GUI 500 shown in FIG. 5 and FIG. 7. In one embodiment, the query displayed in a search summary section 520 is updated by clicking a "Refresh Search Summary" button 522. Once the desired query has been built, the user may execute the query by pressing the "Run Search" button 524. In particular, invokes a function of the application 140 which performs the execution.

The particular manner in which conditions are arranged in response to grouping and ungrouping may be handled in any number of ways. However, for purposes of illustration, some embodiments for arranging the conditions will be described with reference to FIGS. 9–17. In general, FIGS. 9–13 illustrate simplified methods of arranging conditions without regard to first level Boolean logic values. The arrangements of FIGS. 9–12 illustrate the rule that a resulting complex condition is placed on the level of the highest level sub condition. In the illustrative embodiments, the conditions are arranged vertically in order from top to bottom, with the topmost condition being the highest level condition. However, the conditions may be arranged in any manner, including horizontally. Regardless of the particular manner of arrangement, the rules described herein for arranging the conditions may still be applied.

Figure 9:
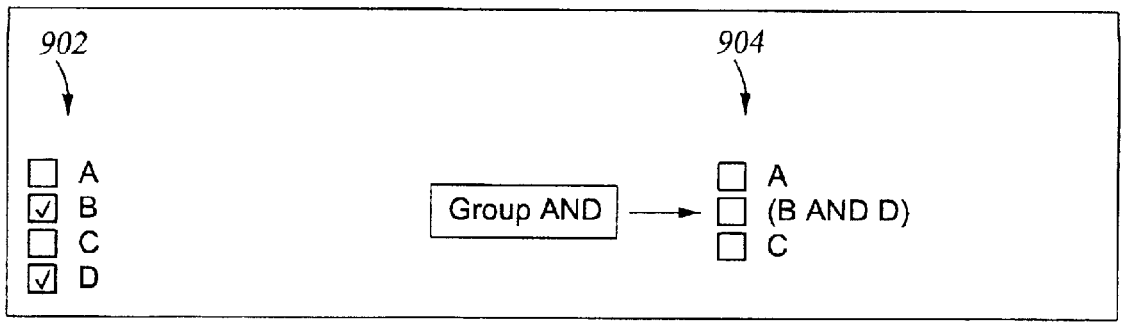
FIGS. 9–11 illustrate simplified methods of arranging grouped conditions without regard to first level Boolean logic values.
Figure 10:
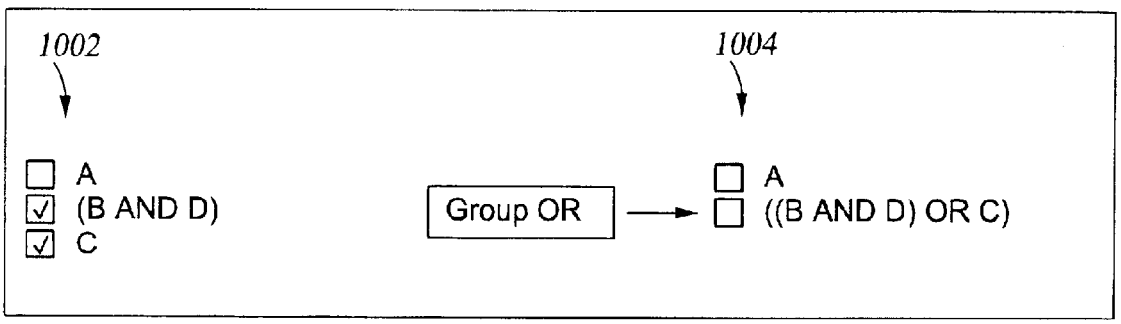
Figure 11:
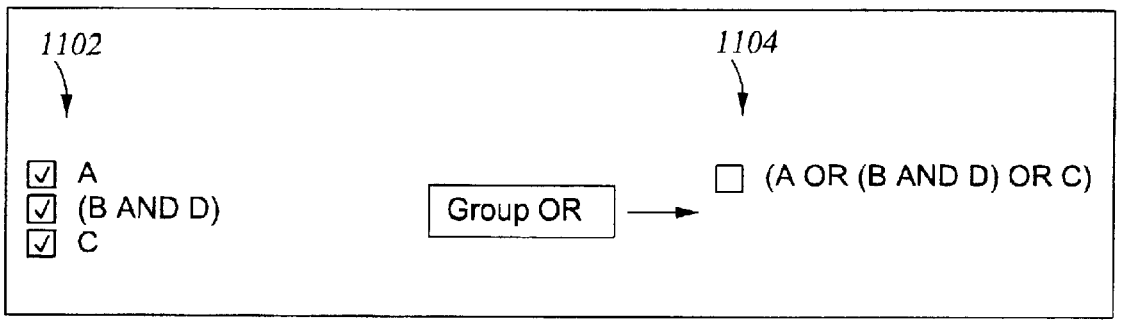

Referring first FIG. 9, an initial arrangement 902 of four conditions is shown. Two conditions (B and D) are selected and ANDed together to produce a resulting arrangement 904. Note that the resulting complex condition (B AND D) is located where the simple subcondition B was previously located. FIG. 10 and FIG. 11 show initial 1002, 1102 and final arrangements 1004, 1104 illustrating the same rule for ORing conditions where the initial arrangements 1002, 1102 include complex conditions.

Figure 12:
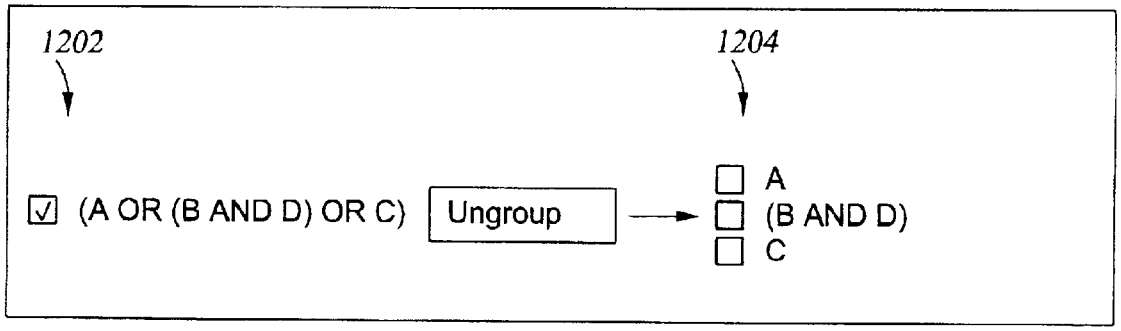
FIGS. 12–13 illustrate simplified methods of arranging ungrouped conditions without regard to first level Boolean logic values.
Figure 13:
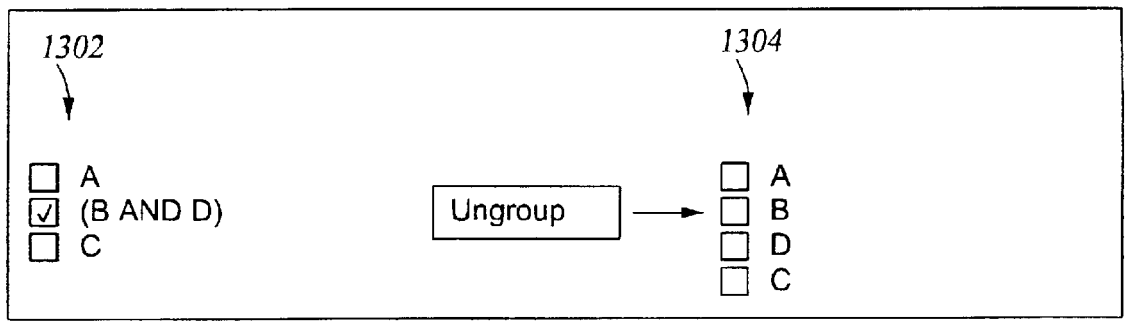

Referring now to FIG. 12, an illustration of ungrouping a complex condition 1202 is shown. The resulting arrangement 1204 illustrates that the only conditions at the highest nested level (defined by the outermost parentheses) are ungrouped for each ungrouping event. Accordingly, conditions A and C are ungrouped, while conditions B and D remain grouped in a complex condition. A user desiring to ungroup the conditions B and D may repeat the ungrouping steps, beginning with clicking on the "Undo Grouped Conditions" button 706 shown in FIG. 7. The user is then presented with the initial arrangement 1302 shown in FIG. 13. Following the successful ungrouping of the complex condition (B AND D), the conditions are shown in their final arrangement 1304. Note that the order of the conditions in the final arrangement 1304 is different from their original arrangement 902 shown in FIG. 9. This is because, in the illustrative embodiment, the order of subconditions in a complex condition is preserved after ungrouping. In some aspects, this approach is desirable because conditions from have been moved closer to other conditions which a user is likely to combine into a group. Relatedly, this predictable placement of conditions facilitates tracking each condition by a user as a given query structure is manipulated.

Figure 14:
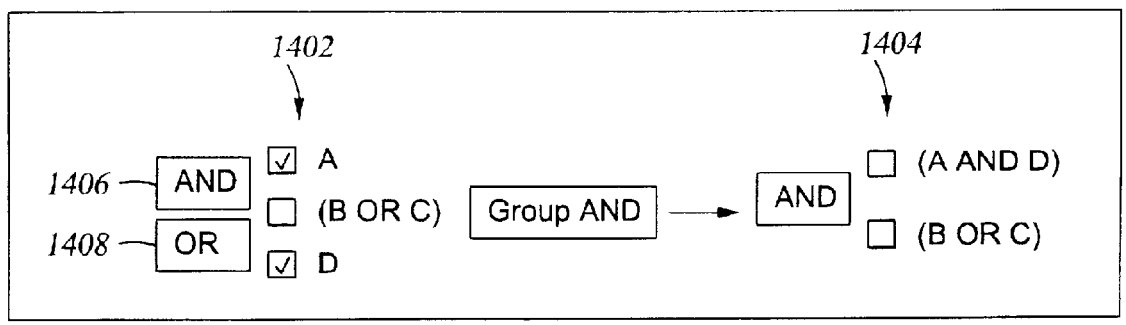
FIGS. 14–17 illustrate the arrangement of conditions with reference to intermediate first level Boolean logic values.
Figure 15:
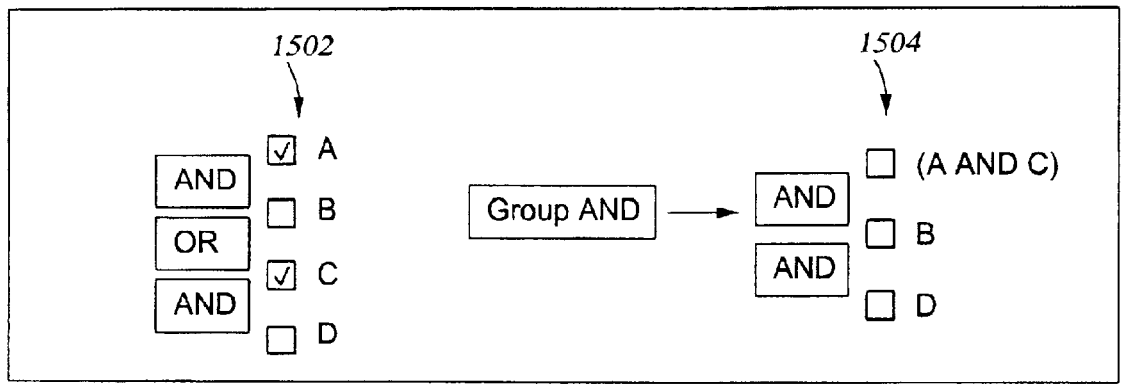
Figure 16:
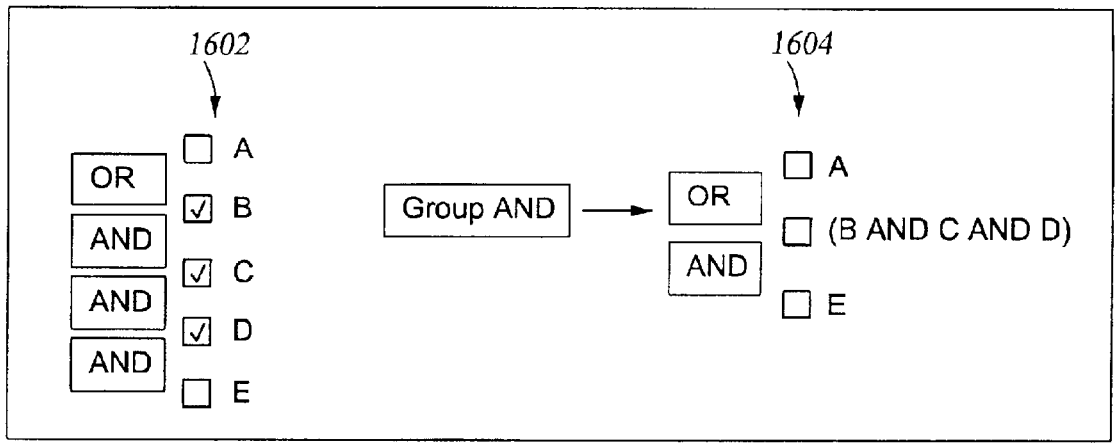
Figure 17:
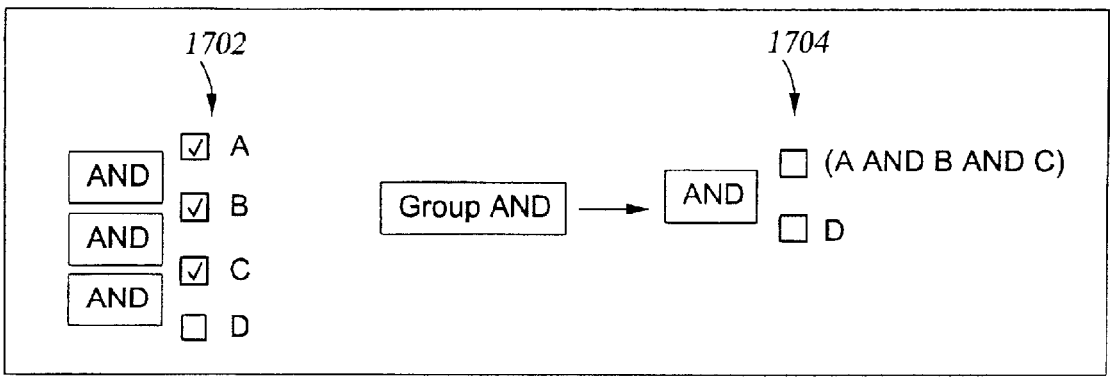

Referring now to FIGS. 14–17 the arrangement of conditions will be described with reference to the intermediate first level Boolean logic values. FIG. 14 shows an initial arrangement 1402 of three conditions, one of which is a complex condition. The first condition (A) is ANDed with the complex condition, while the last condition (D) is ORed with the complex condition. The first condition and the last condition are then ANDed together to form a group (e.g., by clicking the "AND Group" button 604 shown in FIG. 6), shown in the final arrangement 1404. In this case, the first level Boolean logic value AND 1406 is retained, while the first level Boolean logic value OR 1408 is dropped. As a result, the final arrangement 1404 includes two complex conditions ANDed together. Additional examples are provided in FIGS. 15–17 in which selected conditions from an initial arrangement 1502, 1602, 1702 are ANDed together to form final arrangements of 1504, 1604, 1704. In each case, the examples exemplify a common rule: the logical value immediately before a condition being moved up is dropped, and the logical value immediately after a condition being moved up is retained. An exception to the rule is when the condition being moved up is the last condition in the structure, such as in the case of the condition D of the initial arrangement 1402 in FIG. 14. In this case, the first level Boolean logic value is dropped (e.g. the logic value OR 1408 is dropped).

Figure 18:
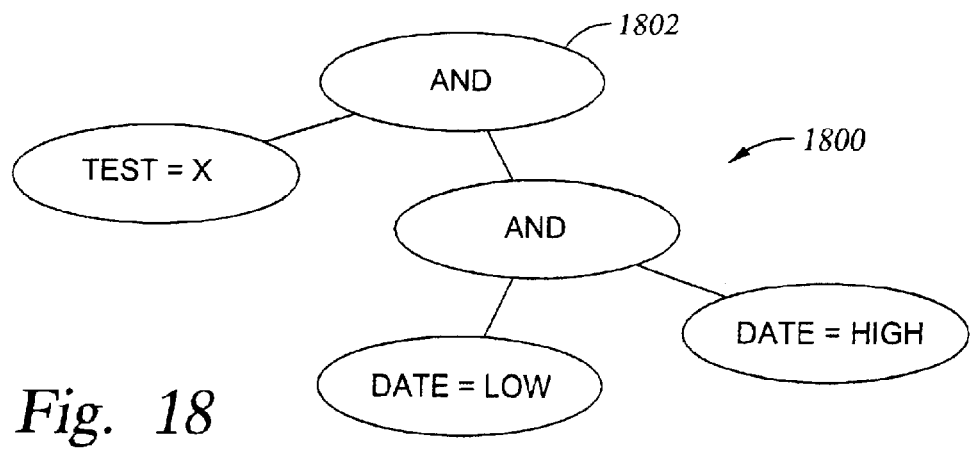
FIG. 18 shows an example of a subtree generated for a user input date range for a specific test.

Further, aspects of the invention provider rules for handling atomic conditions. Atomic conditions are compound conditions that the application 140 generates from a single logical user input. An example of a subtree 1800 generated for a user input date range for a specific test is shown in FIG. 18. Because the user input is logically a single condition, the entire subtree 1800 is flagged as "atomic" at the top AND node 1802. As a result, the atomic condition exemplified by the subtree 1800 is always represented in the graphical user interfaces generated by the application 140 as a single element. While the atomic condition can be grouped and ungrouped for other conditions (including other atomic conditions), the graphical user interface will not allow a user to break apart the subtree 1800.

While the foregoing is directed to embodiments of the present invention, other and further embodiments of the invention may be devised without departing from the basic scope thereof, and the scope thereof is determined by the claims that follow.

What is claimed is:

1. A method of programmatically providing a user interface for creating queries, comprising:
providing graphical user interface content which defines a graphical user interface, comprising:
(i) a region for displaying N conditions of a query;
(ii) N-1 operator selection elements for separately selecting a logic operator relating each of the N conditions to one another, wherein each operator selection element allows for selection from at least two logic operators; and
(iii) a first graphical element for initiating a process of combining two or more conditions of the query together with logic values to form a complex condition, the complex condition being logically related to each of the remaining N conditions.

2. The method of claim 1, wherein the graphical user interface further comprises a second graphic element for initiating a process of separating two or more conditions of the complex condition.

3. The method of claim 1, wherein the region and the first graphical element are on a common screen of the graphical user interface.

4. The method of claim 1, wherein the graphical user interface content is hypertext markup language (HTML) content.

5. The method of claim 1, wherein the conditions comprise comparison operations.

6. The method of claim 1, wherein the complex condition comprises at least one comparison operator and at least one Boolean operator.

7. The method of claim 1, wherein the first graphical element comprises a button.

8. The method of claim 1, wherein the graphical user interface content further defines a second graphical element of the graphical user interface; wherein the third graphical element, which when selected, causes the query to be executed.

9. The method of claim 1, wherein providing the graphical user interface content comprises generating the graphical user interface content by an application configured to access a data repository.

10. The method of claim 9, wherein the application is a Web application.

11. The method of claim 1, further comprising, in response to a user event activating the first graphical element:
combining two or more user-selected conditions of the query together to form the complex condition; and
outputting information which, when rendered on a display device, displays the complex condition.

12. The method of claim 11, wherein the output information is capable of being rendered by a GUI-based program.

13. The method of claim 12, wherein the GUI-based program is a Web browser.

14. The method of claim 1, wherein the at least two logic operators are an AND operator and an OR operator.

15. A method of programmatically providing a user interface for creating queries, comprising:
generating graphical user interface (GUI) content which, when processed by a GUI-based program, defines a graphical user interface, comprising:
(i) a region for displaying N conditions of a query;
(ii) N-1 operator selection elements for separately selecting a logic operator relating each of the N conditions to one another, wherein each operator selection element allows for selection of an AND operator and an OR operator; and
(iii) a first graphical element for initiating a process of combining two or more conditions of the query together with logic values to form a complex condition;
in response to a user event activating the first graphical element:
(i) combining two or more user-selected conditions of the query together to form the complex condition; and
(ii) outputting information which, when rendered on a display device, displays the complex condition, the displayed complex condition being logically related to the remaining N conditions of the query.

16. The method of claim 15, wherein the graphical user interface further comprises a second graphic element for initiating a process of separating two or more conditions of the complex condition.

17. The method of claim 15, wherein generating the graphical user interface is performed by an application configured to access a data repository.

18. The method of claim 15, wherein the conditions comprise comparison operations and wherein the complex condition comprises at least one comparison operator and at least one Boolean operator.

19. A computer-implemented method of creating queries in a user graphical interface, comprising:
displaying a first screen presenting a user with a plurality of categories and, for each category, an associated selection element for user selection of a condition type from a plurality of condition types belonging to the respective category;
for a particular selected condition type, displaying a second screen for creating a query condition, the second screen comprising one or more interface elements for specifying elements of the query condition;
displaying a third screen presenting the user with N query conditions, each of the query conditions having been created using an instance of the second screen appropriately configured with the one or more interface elements specific to the particular selected condition type;
displaying, in the third screen, N-1 operator selection elements for separately selecting a logic operator relating each of the N query conditions to one another;
displaying, in the third screen, selection elements for selecting two or more query conditions of the N query conditions;
displaying an AND grouping button and an OR grouping button;
in response to a user selection of the AND grouping button, automatically combining the selected two or more conditions with one or more AND operators to form a first complex condition; and
in response to a user selection of the OR grouping button, automatically combining the selected two or more conditions with one or more OR operators to form a second complex condition.

20. The computer-implemented method of claim 19, further comprising displaying, in the first screen, a selection element associated with each of the plurality of categories and wherein the selection elements allow exclusive designation of the respective category.

21. The computer-implemented method of claim 19, wherein at least some of the query condition elements, specified in the second screen, are predefined.

22. The computer-implemented method of claim 19, wherein at least some of the associated selection elements are dropdown menus displaying the plurality of condition types belonging to the respective category.

23. The computer-implemented method of claim 19, wherein each operator selection element allows for selection of an AND operator and an OR operator and wherein one of the AND operator and the OR operator is a default selection for each of the operator selection elements.

24. The computer-implemented method of claim 19, further comprising: code for displaying an ungrouping button for initiating an automated process of separating the designated two or more conditions of the complex conditions.

25. A computer-readable medium containing a program which, when executed by a processor, performs an operation of generating a user interface for creating queries, the operation comprising:
generating graphical user interface (GUI) content which, defines a graphical user interface, comprising:
(i) a region for displaying N conditions of a query;
(ii) N-1 operator selection elements for separately selecting a logic operator relating each of the N conditions to one another, wherein each operator selection element allows for selection from at least two logic operators; and
(iii) a first graphical element for initiating a process of combining two or more conditions of the query together with logic values to form a complex condition;
in response to a user event activating the first graphical element:
(i) combining two or more user-selected conditions of the query together to form the complex condition; and
(ii) outputting information which, when rendered on a display device, displays the complex condition, the displayed complex condition being logically related to the remaining N conditions of the query.

26. The computer-readable medium of claim 25, wherein the graphical user interface further comprises a second graphic element for initiating a process of separating two or more conditions of the complex condition.

27. The computer-readable medium of claim 25, wherein generating the graphical user interface is performed by an application configured to access a data repository.

28. The computer-readable medium of claim 25, wherein the conditions comprise comparison operations and wherein the complex condition comprises at least one comparison operator and at least one Boolean operator.

29. The computer-readable medium of claim 25, wherein the at least two logic operators are an AND operator and an OR operator.

30. A computer, comprising:
a memory containing at least an application; and
a processor communicably connected to the memory and which, when executing the application, performs an operation of generating a user interface for creating queries, the operation comprising:
generating graphical user interface content which defines a graphical user interface, comprising:
(i) a region for displaying N conditions of a query;
(ii) N-1 operator selection elements for separately selecting a logic operator relating each of the N conditions to one another, wherein each operator selection element allows for selection of an AND operator and an OR operator; and
(iii) a first graphical element for initiating a process of combining two or more conditions of the query together with logic values to form a complex condition, the complex condition then being logically related to the remaining N conditions of the query.

31. The computer of claim 30, further comprising a web server in memory which, when executed, transmits the graphical user interface content received from the application to a Web browser via a network connection.

32. The computer of claim 30, wherein the conditions comprise comparison operations.

33. The computer of claim 30, wherein the complex condition comprises at least one comparison operator and at least one Boolean operator.

34. The computer of claim 30, wherein the first graphical element comprises a button.

35. The computer of claim 30, wherein the graphical user interface further comprises a second graphic element for initiating a process of separating two or more conditions of the complex condition.

36. The computer of claim 30, wherein the graphical user interface content further defines an third graphical element of the graphical user interface; and wherein the third graphical element, which when selected, causes the query to be executed.

37. The computer of claim 30, further comprising a storage device accessible by the processor and containing a data repository from which data is retrieved in response to execution of the query.

38. A computer-implemented method of creating queries in a user graphical interface, comprising:
   displaying N query conditions;
   displaying N-1 operator selection elements for separately selecting a logic operator relating each of the N query conditions to one another, wherein each operator selection element allows for selection from at least two logic operators and wherein one at least two logic operators is a default selection for each of the operator selection elements;
   receiving user designations of two or more of the N query conditions;
   displaying an AND grouping button and an OR grouping button;
   in response to a user selection of the AND grouping button, automatically combining the designated two or more conditions with one or more AND operators to form a first complex condition; and
   in response to a user selection of the OR grouping button, automatically combining the designated two or more conditions with one or more OR operators to form a second complex condition.

39. The computer-implemented method of claim 38, wherein selection of the AND grouping button and the OR grouping button further automatically relates the respective first and second complex conditions to each of the remaining N query conditions with a logic operator.

40. The computer-implemented method of claim 39, wherein the N query conditions are displayed in a hierarchical arrangement and wherein one of the operator selection elements is displayed between each of the conditions.

41. The computer-implemented method of claim 40, wherein the first and second complex conditions are positioned in the hierarchical arrangement corresponding to a level of a highest level condition of the designated two or more conditions selected to form the respective first and second complex conditions.

42. The computer-implemented method of claim 38, further comprising displaying a checkbox for each of the N query conditions, and wherein receiving user designations of the two or more N query conditions comprises receiving selections of the respective checkboxes for the two or more N query conditions.

43. The computer-implemented method of claim 38, further comprising: displaying a text-form representation of the query; and updating the representation in response to user selections affecting the query.

44. The computer-implemented method of claim 38, wherein the at least two logic operators are an AND operator and an OR operator.

45. The computer-implemented method of claim 38, further comprising:
   displaying an ungrouping button for initiating an automated process of separating the designated two or more conditions of the complex conditions.

46. A computer readable medium containing a graphical user interface application allowing users to construct queries in a user graphical interface, the graphical user interface application, comprising:
   code for displaying N query conditions in a ranked order;
   code for displaying N-1 operator selection elements for separately selecting a logic operator relating each of the N query conditions to one another, wherein a single operator selection element is disposed between each adjacent pair of the N query conditions;
   code for displaying a checkbox for each of the N query conditions;
   code for displaying an AND grouping button and an OR grouping button;
   code for automatically combining two or more user selected query conditions with one or more AND operators to form a first complex condition in response to a user selection of the AND grouping button; and
   code for automatically combining two or more user selected query conditions with one or more OR operators to form a second complex condition in response to a user selection of the OR grouping button.

47. The computer readable medium of claim 46, wherein each operator selection element allows for selection of an AND operator and an OR operator.

48. The computer readable medium of claim 47, wherein one of the AND operator and the OR operator is a default selection for each of the operator selection elements.

49. The computer-implemented method of claim 47, further comprising: code for displaying an ungrouping button for initiating an automated process of separating the designated two or more conditions of the complex conditions.

* * * * *